(12) United States Patent
Goto et al.

(10) Patent No.: US 6,451,390 B1
(45) Date of Patent: Sep. 17, 2002

(54) DEPOSITION OF TEOS OXIDE USING PULSED RF PLASMA

(75) Inventors: Haruhiro H. Goto, Saratoga; Takako Takehara, Hayward; Carl A. Sorensen, Morgan Hill; William R. Harshbarger, San Jose; Kam S. Law, Union City, all of CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 09/544,728

(22) Filed: Apr. 6, 2000

(51) Int. Cl.$^7$ ................................................. H05H 1/24
(52) U.S. Cl. ............ 427/579; 427/255.18; 427/255.393; 427/255.395; 427/294; 427/397.7
(58) Field of Search .................. 427/563, 567, 427/568, 579, 255.18, 255.393, 255.395, 294, 397.7

(56) References Cited

U.S. PATENT DOCUMENTS

| | | | |
|---|---|---|---|
| 5,298,290 A | * | 3/1994 | Jost et al. |
| 5,437,895 A | | 8/1995 | Kodama et al. |
| 5,462,899 A | | 10/1995 | Ikeda |
| 5,618,758 A | | 4/1997 | Tomita et al. |
| 5,968,377 A | * | 10/1999 | Yuasa et al. |

FOREIGN PATENT DOCUMENTS

EP 0 207 767 1/1987

OTHER PUBLICATIONS

L. Overzet, et al., Appl. Phys. Lett., 48(11): 695–97 (1986), No month avail.
Y. Watanabe, et al., Appl. Phys. Lett., 53(14): 1263–65 (1988), No month avail.
Y. Watanabe, et al., Appl. Phys. Lett., 57(16): 1616–18 (1990), No month avail.
C. Denisse, et al., J. Appl. Phys., 60(7): 2536–42 (1986), No month avail.
K. Nomoto, et al., 14$^{th}$ European Photovoltaic Solar Energy Conference and Exhibition, Jun. 30 –Jul. 4, 1997 Palacio de Congresos, Barcelona, Spain.

* cited by examiner

*Primary Examiner*—Bernard Pianalto
(74) *Attorney, Agent, or Firm*—Birgit M. Morris

(57) ABSTRACT

A method for the deposition of a silicon dioxide film onto a substrate using plasma enhanced chemical vapor deposition and TEOS is disclosed. The method includes controlling the deposition rate of silicon dioxide on a substrate by pulsing the radio frequency power supply used to generate a TEOS oxide plasma. The obtained silicon dioxide film is good in electrical and mechanical film properties for the application of forming thin film transistors.

5 Claims, 5 Drawing Sheets

DEPOSITION OF TEOS OXIDE USING PULSED RF PLASMA

BACKGROUND OF THE INVENTION

Field of the Invention

The present invention relates to a silicon dioxide film formed by the plasma enhanced deposition of silicon dioxide through a reaction of TEOS oxide (tetraethoxysilane, tetraethylorthosilicate) in an oxygen plasma and a method for preparing the silicon dioxide film. The silicon dioxide film can be used in thin film transistor (TFT) devices. The method includes controlling the deposition rate of TEOS oxide on a substrate by pulsing the radio frequency (RF) power supply which results in a thin dielectric film with superior film qualities.

Plasma enhanced chemical vapor deposition (PECVD) is a key technology for the production of display devices. For Active Matrix Liquid Crystal Displays (AMLCDs), PECVD is used to deposit the active layers of amorphous Si (a-Si), n+Si and SiN, as well as interlayer dielectric layers and passivation layers. Performance of the thin film transistors used in the arrays of AMLCDs is critically dependent on the conditions and characteristics of the active layers of a-Si, n+Si and SiN dielectric. More recently, polysilicon AML-CDs have been developed, because this display technology simplifies the manufacturing of the displays by enabling the driver circuits to be integrated on the display panels. Again, PECVD technology is used to deposit the amorphous silicon precursor to polysilicon that is prepared by excimer laser annealing. In addition, PECVD technology is also utilized for the development and manufacture of Field Emitter Array (FED) devices.

The dominant active matrix technology is thin film transistors (TFTs) comprised of either amorphous silicon or polycrystalline silicon.

Thin films of amorphous silicon have been fabricated heretofore by a PECVD process comprising:

introducing a silane ($SiH_4$) gas or a mixture of silane gas and hydrogen ($H_2$) gas as a starting material into a film deposition (vacuum) chamber;

applying a high frequency power across a pair of facing electrodes to produce a plasma by electric discharge; and exciting and decomposing the starting material gas to form a thin film of amorphous silicon on the surface of a substrate supported by one of the electrodes.

This film deposition process has been applied to the production of TFTs for use in LCDs or in flat panel displays. In general, the TFT elements are formed on a glass plate. A key point in the fabrication of LCDs of high quality is to deposit a film having a uniform film thickness. Thin films of amorphous silicon are no exception, and uniformity in the film thickness is recognized as an important factor to be fulfilled in their deposition.

During the manufacture of thin films of amorphous silicon, it is known that the discharge between the facing electrodes in PECVD can be effected in either of two ways: one is a continuous discharge method; the other is an intermittent discharge method in which a square wave amplitude-modulated discharge is used.

The continuous discharge method is characterized in that it enables the deposition of high-quality films of amorphous silicon while maintaining the substrate at a relatively low temperature of, e.g., about 250° C. When depositing a thin film of amorphous silicon on a glass plate having a large area (e.g., 20×20 $cm^2$), however, this method is problematic because it is difficult to obtain thin films of uniform thickness. In addition, semiconductor films formed by methods that achieve a higher-rate film formation by supplying a larger high-frequency power and/or supplying a larger amount of material gas may contain a large amount of polysilane powder if the pressure is not controlled properly, thereby resulting in a product having a low yield.

The intermittent discharge method comprises applying a square wave amplitude-modulated radio frequency (rf) between facing electrodes. The other basic film deposition conditions (e.g., pressure, substrate temperature, and composition and flow rate of the starting material gas) may be the same as those used in the continuous discharge method. The square wave amplitude-modulated discharge method was initially proposed by Overzet et al., see L. J. Overzet et al., Appl. Phys. Lett., 48(11):695–97 (1986), which discloses a process that enhances deposition in low power rf discharges. This method has been studied in further detail by Watanabe et al. of Kyushu University. For example, Watanabe et al., Appl. Phys. Lett., 53(14): 1263–5 (1988), discloses the use of a modulated rf discharge of silane diluted with helium to improve the quality of α-Si:H films.

Intermittent discharge methods are known to reduce polysilane powder generation within the reaction apparatus when depositing an a-Si: H film. See Watanabe et al., *Appl. Phys. Lett.*, 57(16): 1616–18 (1990).

Denisse et al. of Utrecht State University have reported the application of an intermittent discharge method to a process for depositing a thin film of $SiO_xN_y$. See Denisse et al., J. Appl. Phys. 60(7):2536–42 (1986).

U.S. Pat. Nos. 5,437,895 and 5,618,758 disclose a process for forming a silicon-containing thin film on an insulating substrate using PECVD while intermittently generating a high frequency discharge.

U.S. Pat. No. 5,298,290 discloses that the parameters for a plasma polymerization method depend very strongly on the gaseous compounds used. It is known from European patent reference EP A 207 767, to pulsate rf plasma, during a surface treatment by plasma enhanced reactive processes. Without any specific selection, a large number of different materials are proposed for processing in this reference, e.g., $Si_3N_4$, $TiO_2$, $Al_2O_3$, BN, $SiO_2$, $B_4C$, SiC, HC, TiC, TiN, BP. All of these coating materials are not produced by polymerization. The reference discloses that how the process behaves, depends on plasma modulation, and to a large extent, on the specific gaseous compound supplied for the coating operation.

Silicon dioxide films formed from the oxidation of TEOS oxide (tetraethoxysilane, tetraethylorthosilicate) are commonly used in the semiconductor industry as intermetal-dielectric films. There is an interest in using TEOS as a gate oxide for thin film transistor (TFT) devices. For example, U.S. Pat. No. 5,462,899, the entire contents of which are incorporated herein by reference, discloses the use of a continuous discharge method to form a silicon dioxide film on a substrate using TEOS as a principal reagent. However, a PECVD process based on a continuous discharge method is disadvantageous in that thinner films of TEOS oxide having uniform thickness cannot be achieved.

The present inventors have determined that one of the obstacles in using a continuous discharge method to form a silicon dioxide film using TEOS oxide is that the deposition rate could not be low enough to control the thickness of the gate oxide for applications in which the thickness of the silicon dioxide film is 500 Å or less without losing desirable qualities of important film properties.

Prior to the present invention, it had not been examined whether using intermittent discharge was suitable for use with TEOS oxide. The present inventors have discovered that PECVD processes using an intermittent discharge method enable the deposition of TEOS oxide to form a thin silicon dioxide film with uniform thickness over the surface of an insulating substrate. The thin films prepared by the method of the invention permit enhanced device and circuit performance, including increased switching speed, reduced power dissipation and smaller device and circuit areas.

The thin silicon dioxide films prepared by the method of the invention provide better MOS (metal-oxide-semiconductor) transistor performance.

SUMMARY OF THE INVENTION

Accordingly, an object of the present invention is to provide a process for forming a thin film of silicon dioxide of uniform thickness over the surface of an insulating substrate.

In accordance with the above object, the method of the invention involves decreasing the deposition rate of silicon dioxide, while at the same time achieving thinner films with high uniformity.

A method for producing a silicon dioxide film according to the present invention includes the steps of:

placing a TEOS precursor and oxygen in a plasma state;

decomposing the TEOS gas into active species;

reacting the TEOS with oxygen ions or radicals in the plasma;

depositing the active species on a substrate;

wherein energy for generating the TEOS oxide plasma is intermittently supplied at a supply time interval.

In one embodiment of the method for producing a silicon dioxide film of the invention, the silicon dioxide film is deposited at a rate at of less than 1100 angstroms/min, and the energy for plasma generation is intermittently supplied at a supply time interval of, for example, 1150 watts for 1 second and brought to at or about, for example, zero watts, for a time interval of, for example, 3 seconds. One skilled in the art would readily appreciate that deposition rate is hardware dependent. Thus, one skilled in the art would also readily appreciate that the required rate and the required pulse strength and on and off time as well as the required specific parameters to achieve a film having a desired film thickness are machine dependent. For example, by adjusting the parameters of the pulse (i.e., peak height or maximum power, peak floor or minimum power, peak duration (length of maximum power pulse) and duty cycle (number of maximum power pulses per unit time)), films of a desired thickness can be achieved. The method of the invention allows films thinner than 300 Å, e.g., 200 Å, or films thicker than 300 Å to be obtained.

In a preferred embodiment of the method for producing a silicon dioxide film of the invention, the power for plasma generation is intermittently brought down to at or about zero watts.

Thus, the invention described herein makes possible the advantages of providing a method for forming a high-quality silicon dioxide film suitable for use in thin film transistor devices. The film of the invention exhibits enhanced performance, e.g., faster switching speed, lower power dissipation and smaller device and circuit areas.

The present invention is illustrated below in greater detail with reference to non-limiting examples and accompanying drawings. It should be understood, however, that the present invention is not to be construed as being limited thereto.

BRIEF DESCRIPTION OF THE DRAWINGS

FIG. 3 shows a capacitance-voltage (C-V) curve for TEOS oxide deposited on P-type wafer using a 15% duty cycle.

FIG. 4 shows a C-V curve for TEOS oxide deposited on P-type wafer using a 20% duty cycle.

FIG. 5 shows a C-V curve for TEOS oxide deposited on P-type wafer using a 30% duty cycle.

DETAILED DESCRIPTION OF THE PREFERRED EMBODIMENTS

All patents, patent applications and literature that may be cited in this disclosure are incorporated herein by reference in their entirety. In the case of inconsistencies, the present disclosure will prevail.

In order to solve the above-mentioned problems, the present invention provides a method for forming a high-quality silicon dioxide film using TEOS oxide. The present invention also provides a silicon dioxide film prepared by the method.

Hori, *Gate Dielectric and MOS ULSI's* (1997), discloses that scaling down or shrinking of MOS device size has been used to enhance device and circuit performance, including faster switching speed, lower power dissipation and smaller device and circuit areas.

The present inventors have found that by pulsing the rf power, the deposition rate could be controlled without degrading film quality, namely capacitance-voltage (C-V) characteristics such as flat-band shift and hysteresis. Moreover, the hysteresis of the film of the invention is better than ever had been achieved previously by continuous discharge methods. Prior to the invention, a hysteresis of 0.1 V was the best attainable. In accordance with the invention, a hysteresis of less than 0.1 V (not even measurable) can be achieved.

According to the present invention, a silicon dioxide film is formed using TEOS oxide under conditions similar to conventional TEOS oxide plasma processing except that the deposition rate of TEOS oxide is controlled by pulsing the rf power supply. As a result, a silicon dioxide film having excellent flat-band shift and hysteresis can be obtained.

Figure 1:
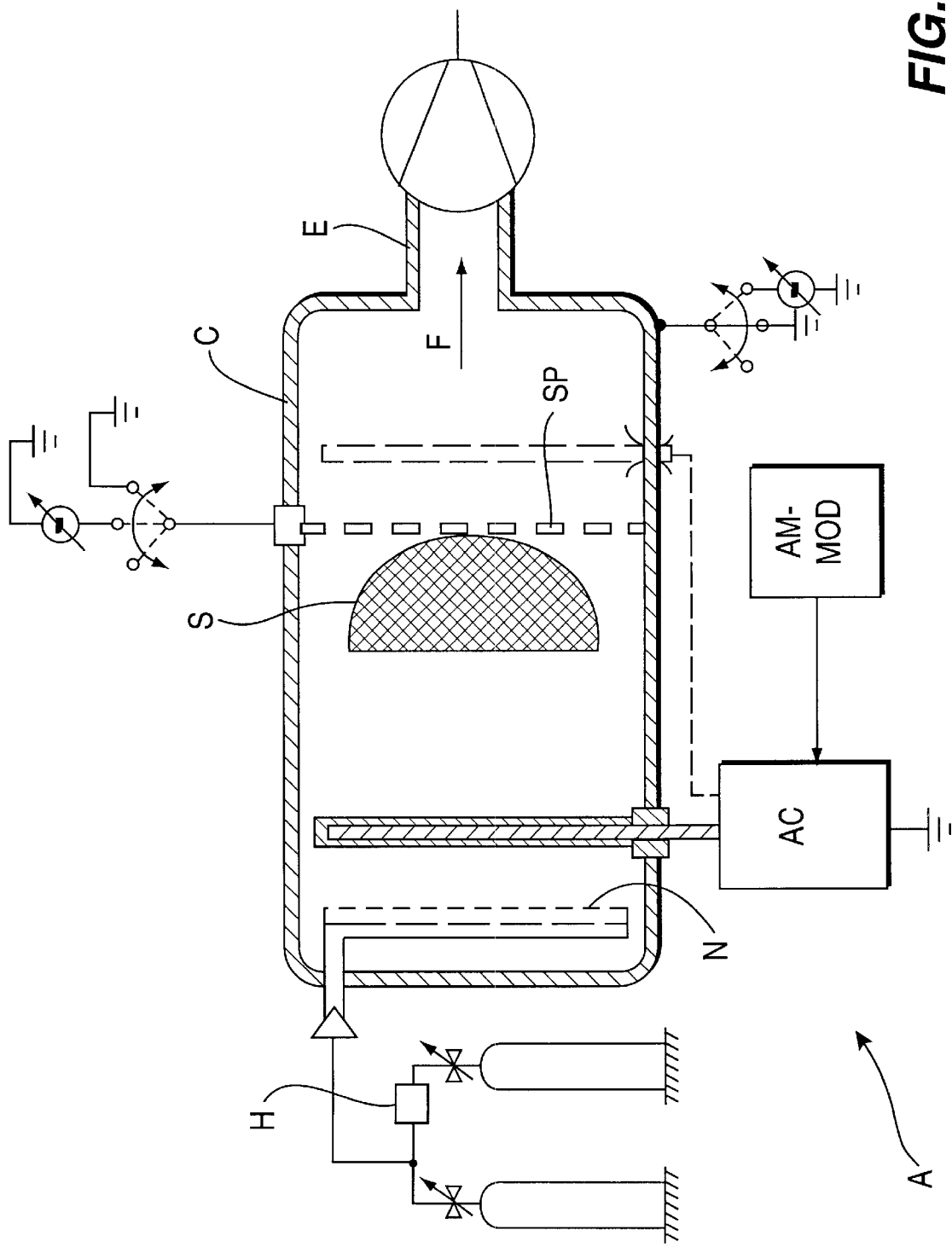
FIG. 1 shows a diagram of a conventional PECVD apparatus that can be used to carry out the method of the present invention.

FIG. 1 shows a diagram of a conventional PECVD apparatus that can be used to carry out the method of the present invention. The apparatus A has a conventional reaction chamber C (only partly illustrated) in which a substrate S is placed on a susceptor SP. A heater module H is provided so as to heat the substrate S together with the susceptor SP. Opposite to the substrate surface, there is a nozzle head N arranged so as to inject gas toward the substrate S. The reaction chamber C also has an exhaust port E.

A method for producing a silicon dioxide film of the invention may comprise:

placing a TEOS precursor and oxygen in a plasma state;

decomposing the TEOS gas into active species;

reacting the TEOS with oxygen ions or radicals in the plasma; and depositing the active species on a substrate;

wherein energy for generating the TEOS oxide plasma is intermittently supplied at a supply time interval.

EXAMPLES

Example 1

This example relates to the deposition of a silicon dioxide film using TEOS oxide in the intermittent discharge method of the invention.

Using an AKT 1600B System 54 Chamber A, six inch wafers with 400 mm×500 mm×0.7 mm carrier glass were deposited with TEOS oxide using the same process conditions discussed below except for the duty cycles. A first set of wafers were deposited with 15% duty cycle, a second set wafers were deposited with 20% duty cycle, a third set of wafers were deposited with 30% duty cycle and a fourth set of wafers were deposited with 40% duty cycle. The system was run at the following process conditions: 3500 standard cubic centimeter (sccm) $N_2O$, 100 sccm He, 185 sccm TEOS, 800 mTorr, 1150 W, 500 msec rf-on, 450 mil., 400° C. The entire process sequence, which consists of the following, was run manually:

(1) Standard Plasma Clean (5 min.) 900 sccm $NF_3$, TVO, 1800 W, rf only, 1600 mil.

(2) Season (1 min.) 6000 sccm $N_2O$, 100 sccm He, 300 sccm TEOS, 1300 mTorr, 800 W, 1400 mil.

(3) Deposition Based on standard TEOS oxide processing conditions, the plasma on time was controlled by pulsing the rf generator. Plasma on time was set to 500 msec and the duty cycle was varied to control plasma-off periods. Since no deposition takes place when the plasma is turned off, the time average deposition rate can be reduced without degrading the film quality.

(4) Power Lift To discharge static forces holding the substrate to the susceptor. 1000 sccm $H_2$, 1200 mTorr, 200 W, move to exchange.

(5) Anneal All wafers were annealed in 3000 sccm $N_2$ and 150 sccm $H_2$ mixture at a pressure of 9 Torr and an electrode spacing of 1100 mil. The susceptor temperature was controlled within ±1 degree of the set point.

The deposition rates at 10 to 40% duty cycles were measured on silicon wafers. From thickness measurements the following deposition rates (in angstroms/min.) were obtained for the corresponding duty cycles shown in parenthesis: 194 (15%), 258 (20%), 424 (30%), 585 (40%).

Figure 2:
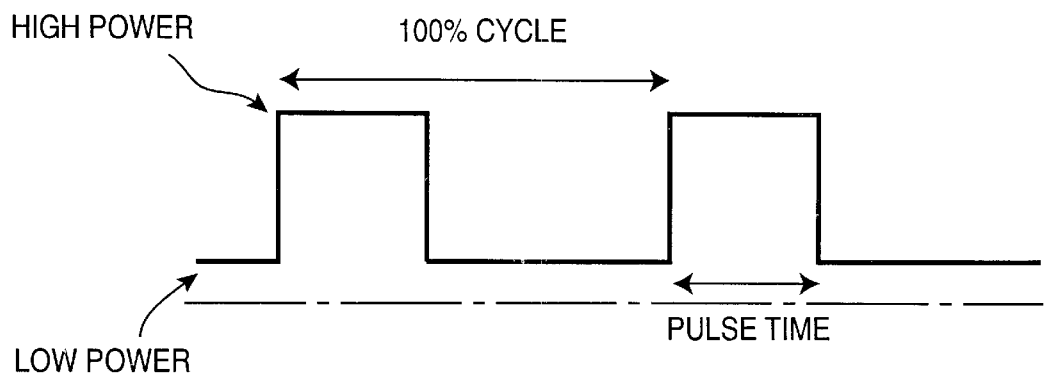
FIG. 2 is a schematic showing the parameters that are controlled in accordance with the method of the invention

FIG. 2 is a graph showing experimental results of Example 1 of the present invention. FIG. 2 shows a capacitance-voltage (C-V) curve for TEOS oxide deposited on P-type wafer using a 15% duty cycle. The sample was annealed at 480° C. susceptor temperature for 15 min.

Figure 3:
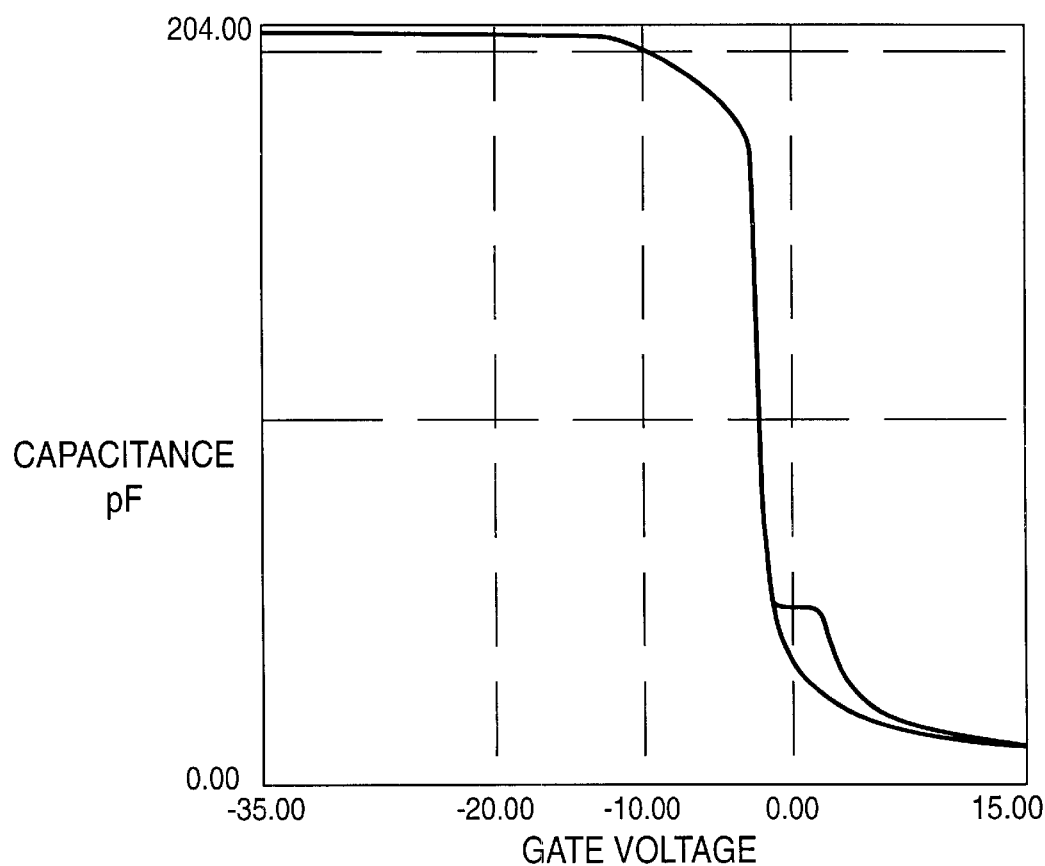
FIG. 3 is a graph showing experimental results of Example 1 of the present invention.

FIG. 3 is a graph showing experimental results of Example 1 of the present invention. FIG. 3 shows a C-V curve for TEOS oxide deposited on P-type wafer using a 20% duty cycle. The sample was annealed at 450° C. susceptor temperature for 15 min. No hysteresis was observed.

Figure 4:
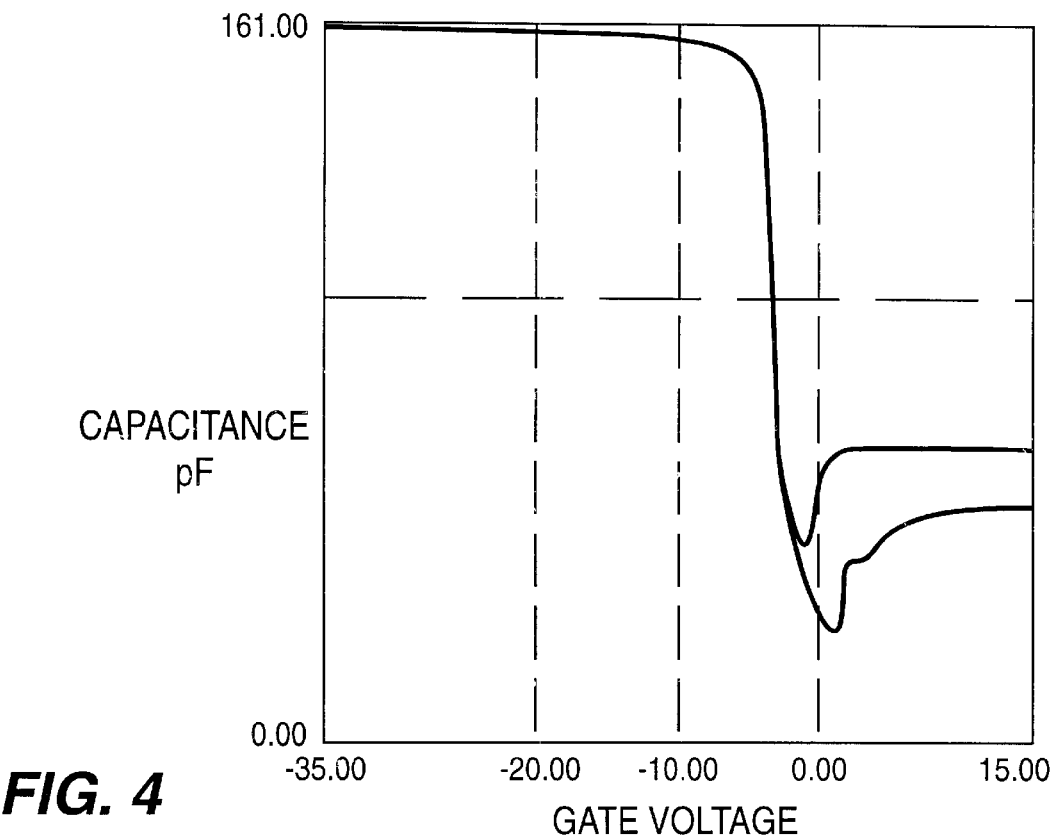
FIG. 4 is a graph showing experimental results of Example 1 of the present invention.
Figure 5:
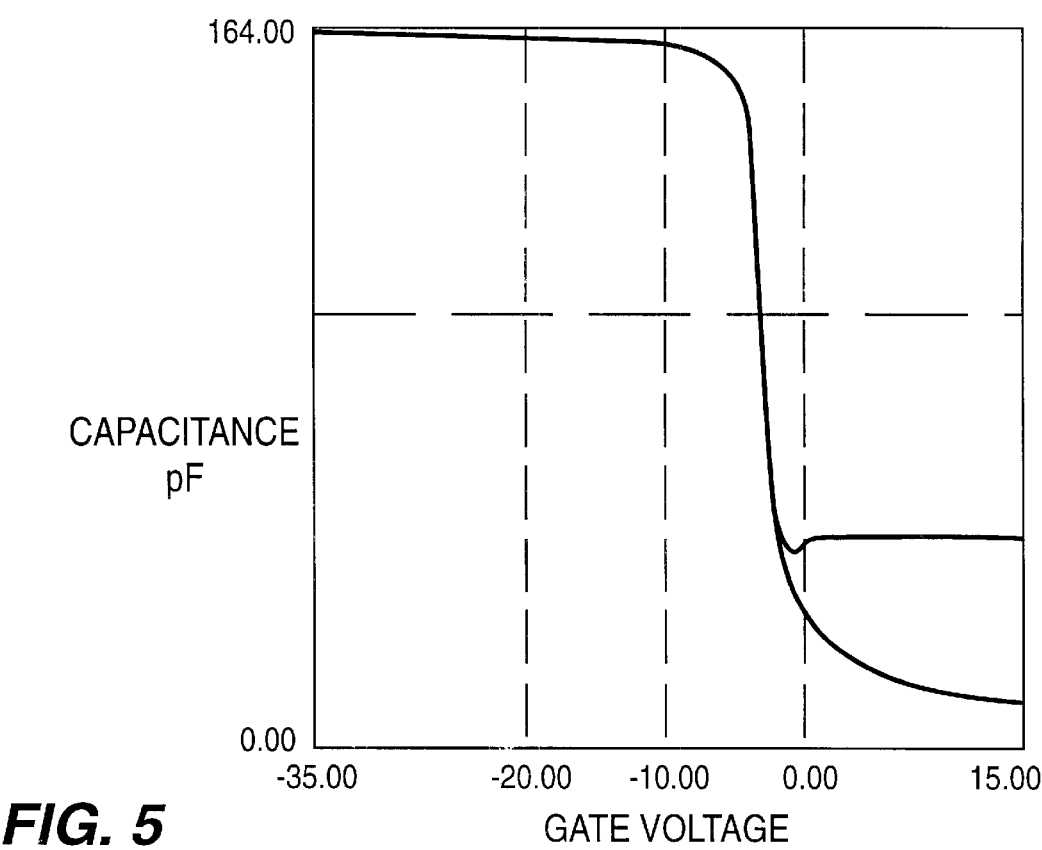
FIG. 5 is a graph showing experimental results of Example 1 of the present invention.

FIG. 4 is a graph showing experimental results of Example 1 of the present invention. FIG. 4 shows a C-V curve for TEOS oxide deposited on P-type wafer using a 30% duty cycle. The sample was annealed at 480° C. susceptor temperature for 15 min. Very little hysteresis (<0.1 V) was observed.

Example 2

Referring to Table I (below), the data in Table I were obtained using oxide films which were normalized (~1500Å) thickness. Table I shows that the deposition rate of silicon dioxide can be controlled by controlling the % duty cycle. For instance. the C-V curve for the reference thermal oxide film shows Vfb(Flatband capacitance)=−2.0 V, Vth (Threshold voltage)=1.465 V, Neff(Effective oxide charge density)=2.477E11 $cm^2$, and hysteresis=0.15 V. The additional C-V characteristics in Table 1 also show the integrity of the oxide film.

TABLE 1

| | | | | ((Pulse Plasma (Teos) | | | | | | |
|---|---|---|---|---|---|---|---|---|---|---|
| Variable Name | #1 Duty Cycle | #2 Pulse Time | | | | | | | | |
| Unit | % | msec | | #1 | #2 | | #3 | #4 | #5 | #6 |
| Level 1 | 20 | 100 | Function | Oxide DR | UNIF. | Thickness | Vfb | Vth | Neff | Dit |
| Level 2 | 30 | 1000 | Name | A/MIN | +/− % | Å | V | V | E11cm-2 | E11cm-2 |
| RUN #1 | 20 | 100 | RUN #1 | 248 | 10.9 | 1588 | −1.872 | −1.334 | 2.709 | 16.27 |
| RUN #2 | 20 | 1000 | RUN #2 | 268 | 11.6 | 1474 | −1.675 | −1.165 | 2.664 | 15.48 |
| RUN #3 | 30 | 100 | RUN #3 | 456 | 8.2 | 1589 | −1.933 | −1.405 | 2.941 | 16.87 |
| RUN #4 | 30 | 1000 | RUN #4 | 351 | 13.6 | 1316 | −2.275 | −1.781 | 3.770 | 16.19 |

High RF = 1150 W, Low RF = 0 W.

Example 3

Figure 6A:
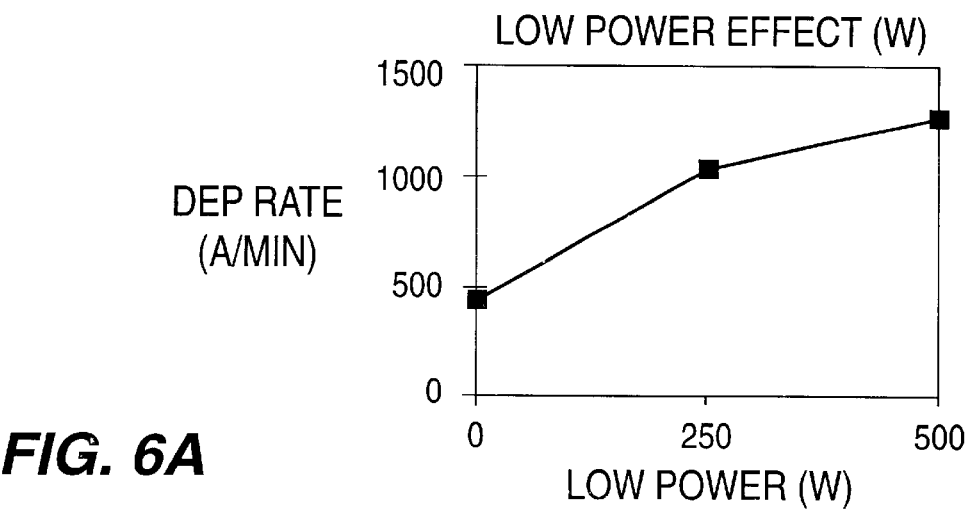
FIGS. 6A, 6B, 6C, 6D, 6E and 6F are graphs showing the results of varying power (FIGS. 6A and 6B); duty cycle (FIGS. 6C and 6D); and pulse time (FIGS. 6E and 6F).
Figure 6B:
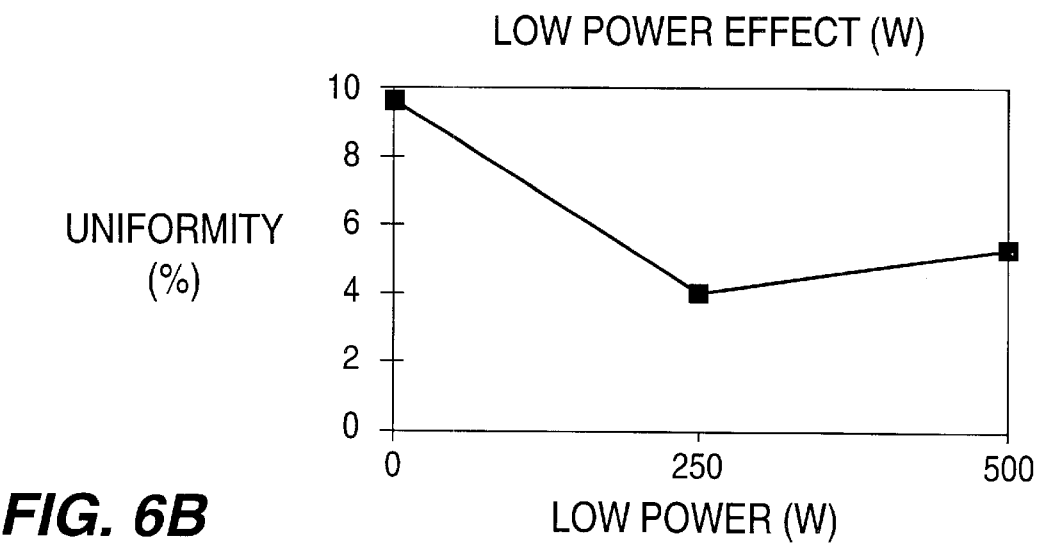
Figure 6C:
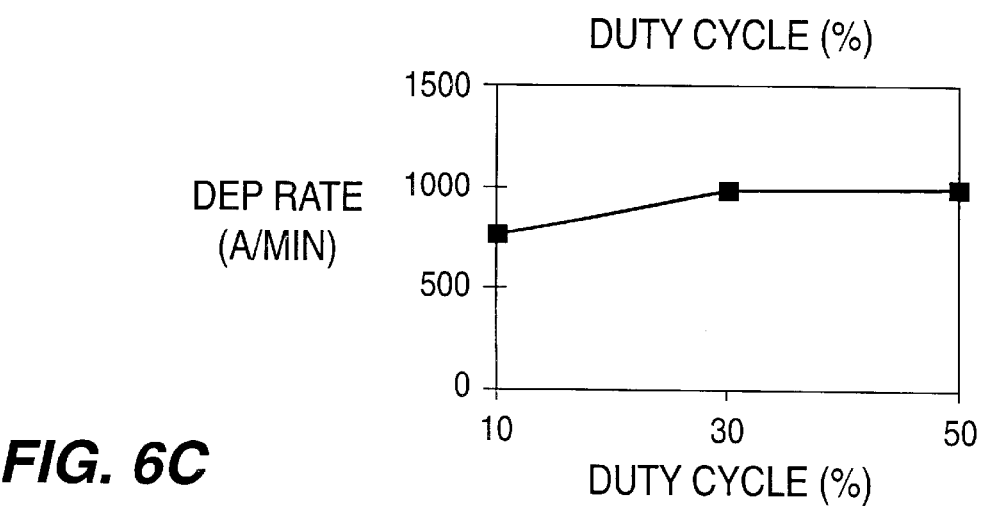
Figure 6D:
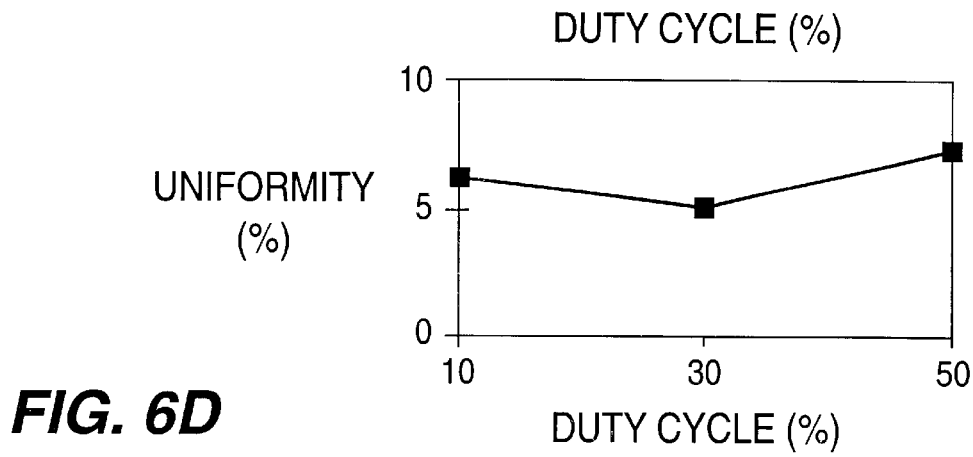
Figure 6E:
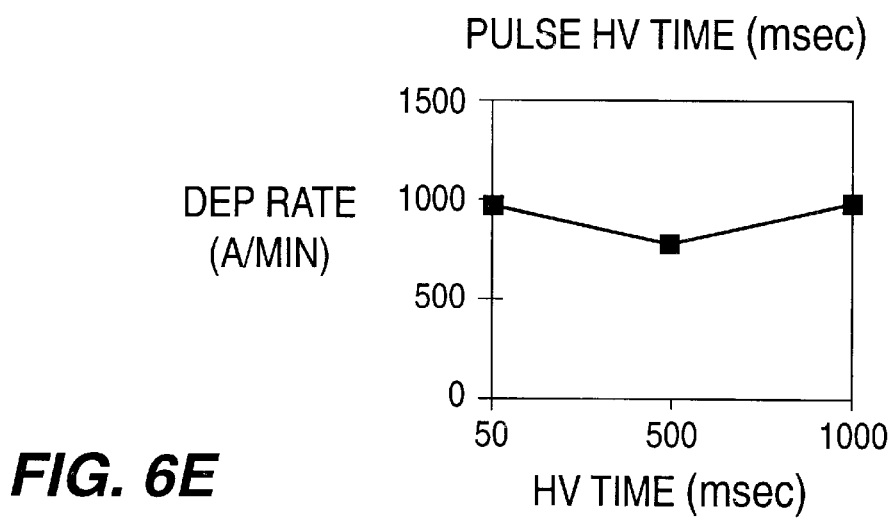
Figure 6F:
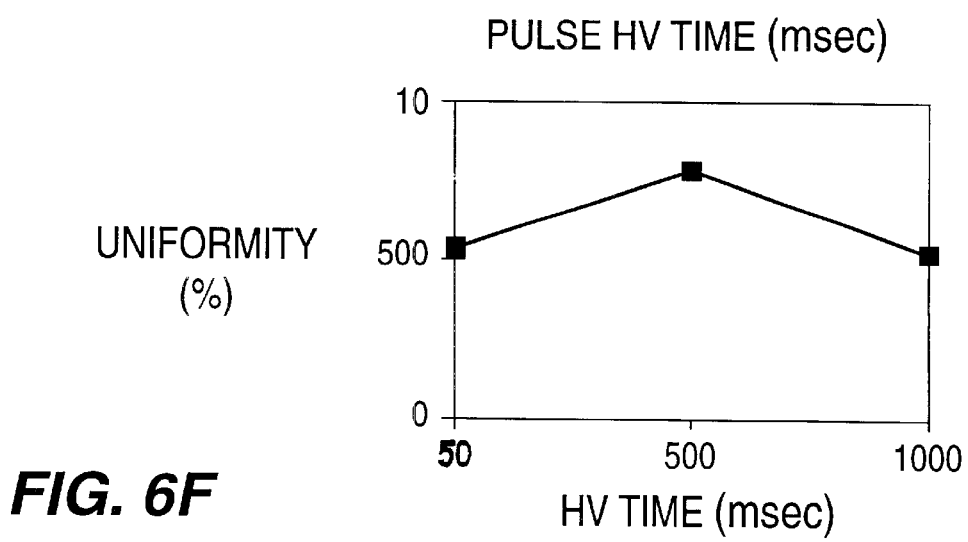

Referring to Table 2 (below) and FIGS. 6A to 6F, Table 2 and FIGS. 6A to 6F show the responses from varying three parameters, i.e., power (FIGS. 6A and 6B), duty, cycle (FIGS. 6C and 6D); and pulse time (FIGS. 6E and 6F). For the ranges studied, the low power setting point gave the biggest response (836); followed by the duty cycle (236). FIG. 6 demonstrates that the deposition rate can be reduced to 165 Å/min by setting the low power to zero with 10% duty cycle.

TABLE 2

Pulse Plasma Study (TEOS)

| Variable Name Unit | #1 Low Power Watts | #2 Duty Cycle % | #3 Pulse Time msec | Function Name Name | #1 Dep. Rate A/MIN | #2 UNIF. +/- % |
|---|---|---|---|---|---|---|
| Level 1 | 0.00 | 10.00 | 50.00 | | | |
| Level 2 | 250.00 | 30.00 | 500.00 | | | |
| Level 3 | 500.00 | 50.00 | 1000.00 | | | |
| RUN #1 | 0.00 | 10.00 | 50.00 | RUN #1 | 165.00 | 10.00 |
| RUN #2 | 0.00 | 30.00 | 500.00 | RUN #2 | 367.00 | 9.20 |
| RUN #3 | 0.00 | 50.00 | 1000.00 | RUN #3 | 782.00 | 9.30 |
| RUN #4 | 250.00 | 10.00 | 500.00 | RUN #4 | 944.00 | 5.20 |
| RUN #5 | 250.00 | 30.00 | 1000.00 | RUN #5 | 997.00 | 3.30 |
| RUN #6 | 250.00 | 50.00 | 50.00 | RUN #6 | 1162.00 | 3.40 |
| RUN #7 | 500.00 | 10.00 | 1000.00 | RUN #7 | 1171.00 | 3.50 |
| RUN #8 | 500.00 | 30.00 | 50.00 | RUN #8 | 1607.00 | 2.80 |
| RUN #9 | 500.00 | 50.00 | 500.00 | RUN #9 | 1045.00 | 9.30 |
| RUN #D1a | 0.00 | 10.00 | 50.00 | RUN #D1a | 135.00 | 9.80 |

Center condition: RF 1150 W.

As described in detail in the foregoing, the present invention provides a way of forming a thin film of silicon dioxide of a uniform thickness on a substrate. The present invention is therefore of great use in manufacturing silicon dioxide films of high quality.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for reducing the deposition rates of silicon oxide from a tetraethoxysilane precursor gas using a plasma-enhanced chemical vapor deposition vacuum chamber including a substrate on a support and a source of RF energy comprising passing a mixture of tetraethoxysilane and oxygen into the chemical vapor deposition chamber at a reduced pressure and forming a plasma therefrom, and intermittently reducing and increasing the power of the RF power source at a preselected time interval so as to reduce the average silicon oxide deposition rate.

2. The method for producing a silicon oxide film of claim 1, wherein the silicon oxide film is deposited to a thickness of no more than 500 angstroms.

3. The method for producing silicon oxide films of claim 1, wherein said silicon oxide films are annealed.

4. The method for producing a silicon oxide film of claim 1 wherein the power source for providing said energy for plasma generation is intermittently brought down to about 500 watts or less.

5. The method for producing a silicon oxide film of claim 1, wherein said substrate is glass.

* * * * *